(12) United States Patent
Yang et al.

(10) Patent No.: US 10,349,331 B2
(45) Date of Patent: Jul. 9, 2019

(54) PACKET PROCESSING METHOD FOR SOFTWARE-DEFINED NETWORK

(71) Applicant: Industrial Technology Research Institute, Hsinchu (TW)

(72) Inventors: Shun-Neng Yang, Taichung (TW); Chai-Hien Gan, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 189 days.

(21) Appl. No.: 15/475,145

(22) Filed: Mar. 31, 2017

(65) Prior Publication Data
US 2017/0208529 A1 Jul. 20, 2017

Related U.S. Application Data

(62) Division of application No. 14/580,233, filed on Dec. 23, 2014, now Pat. No. 9,693,282.

(51) Int. Cl.
| | |
|---|---|
| *H04L 29/06* | (2006.01) |
| *H04W 40/02* | (2009.01) |
| *H04W 28/02* | (2009.01) |
| *H04L 12/755* | (2013.01) |
| *H04L 12/721* | (2013.01) |
| *H04L 12/801* | (2013.01) |

(52) U.S. Cl.
CPC ........... *H04W 40/02* (2013.01); *H04L 45/021* (2013.01); *H04L 45/38* (2013.01); *H04L 47/34* (2013.01); *H04L 69/22* (2013.01); *H04W 28/0289* (2013.01)

(58) Field of Classification Search
CPC .......... G06F 2009/45595; G06F 9/455; G06F 9/45558; H04L 49/70
See application file for complete search history.

(56) References Cited

U.S. PATENT DOCUMENTS

| | | | | |
|---|---|---|---|---|
| 2014/0269269 | A1* | 9/2014 | Kovvali | H04W 24/08 370/229 |
| 2015/0163072 | A1* | 6/2015 | Kalkunte | H04L 12/4633 370/392 |
| 2015/0172183 | A1* | 6/2015 | DeCusatis | H04L 12/4633 370/392 |
| 2015/0244617 | A1* | 8/2015 | Nakil | G06F 9/45558 709/224 |

* cited by examiner

*Primary Examiner* — Mansour Oveissi
*Assistant Examiner* — David M Oveissi
(74) *Attorney, Agent, or Firm* — JCIPRNET

(57) ABSTRACT

A packet processing method adapted to a software-defined network is provided. The packet processing method includes the following steps: receiving an upstream packet transmitted to a remote network from a user equipment; removing a tunnel header of the upstream packet, and transmitting the upstream packet to the remote network; receiving a downstream packet transmitted to the user equipment from the remote network; selecting one of a plurality of routing paths coupled to the user equipment to transmit the downstream packet; and adding a tunnel header corresponding to the selected routing path to the downstream packet, and transmitting the downstream packet to the user equipment through the selected routing path.

4 Claims, 6 Drawing Sheets

PACKET PROCESSING METHOD FOR SOFTWARE-DEFINED NETWORK

CROSS-REFERENCE TO RELATED APPLICATION

This application is a divisional application of and claims the priority benefit of an application Ser. No. 14/580,233, filed on Dec. 23, 2014, now pending. The entirety of the above-mentioned patent application is hereby incorporated by reference herein and made a part of this specification.

BACKGROUND

Technical Field

The disclosure relates to a control method, a controller and a packet processing method for a bandwidth aggregation technique of a software-defined network (SDN).

Related Art

Smart phones having multiple network interfaces are widely used in daily life. A smart phone can simultaneously connect a plurality of wireless networks to establish a plurality of network connections. The wireless networks can be connected to the Internet to facilitate the smart phone to obtain services and resources from the Internet.

A present bandwidth aggregation technique is to set a centralized network device (which is referred to as an aggregation entity (AE)) at a network end. The AE aggregates a plurality of network connections of the smart phone into a single network connection. If one of the wireless networks cannot be used due to signal interference or mobility of the smart phone, etc., the AE can freely switch the packets of the smart phone between the other wireless networks, so as to avoid transmission interruption.

The present AE is centralized, namely, a plurality of smart phones probably share a same AE for connecting the Internet.

SUMMARY

The disclosure is directed to a packet processing method for a software-defined network (SDN), by which a plurality of switches in the SDN are used to replace a conventional single aggregation entity (AE) to avoid a bottleneck effect of the centralized AE.

The disclosure provides a packet processing method for a software-defined network (SDN), which includes following steps. An upstream packet transmitted to a remote network from a user equipment (UE) is received. A tunnel header of the upstream packet is removed, and the upstream packet is transmitted to the remote network. A downstream packet transmitted to the UE from the remote network is received. One of a plurality of routing paths coupled to the UE is selected to transmit the downstream packet. A tunnel header corresponding to the selected routing path is added to the downstream packet, and the downstream packet is transmitted to the UE through the selected routing path.

According to the above descriptions, the controller and the UE can adjust the packet transmission proportion between the routing paths to balance a network usage rate of each routing path, so as to avoid a network congestion.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
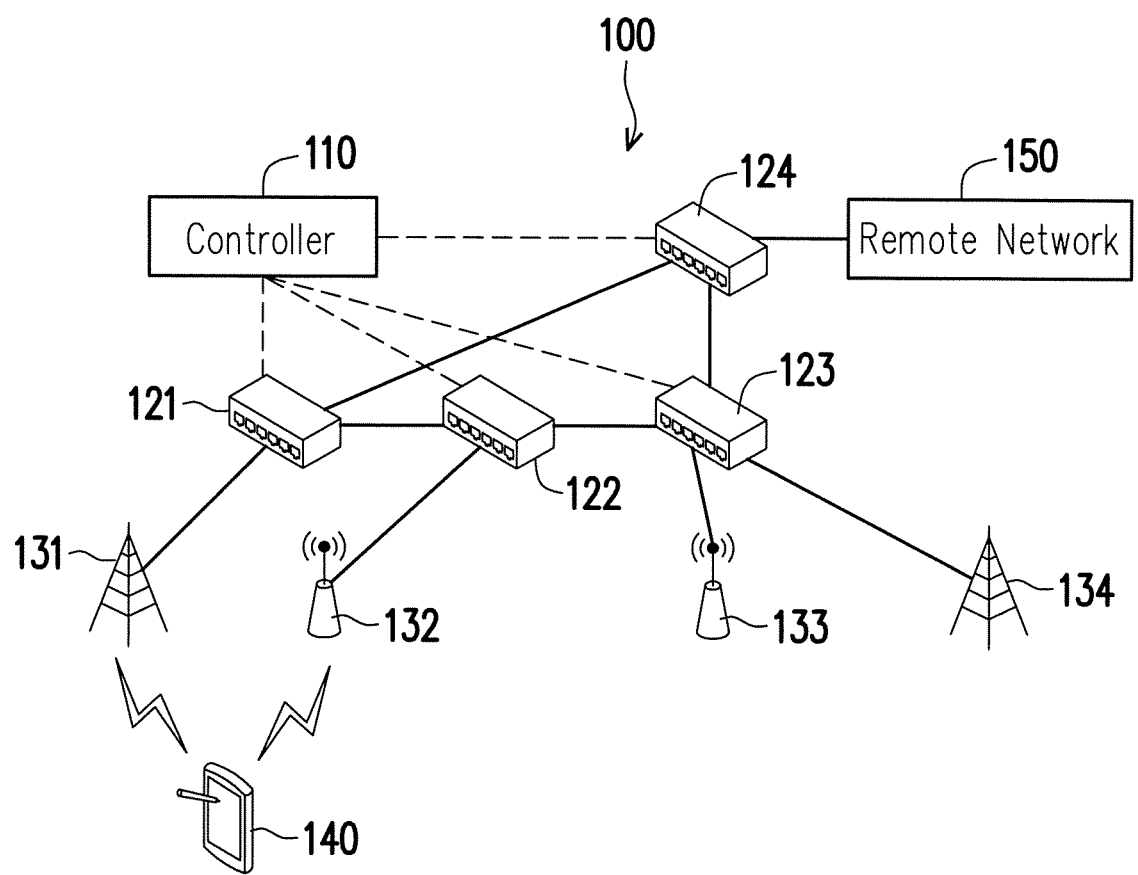
FIG. 1 is a schematic diagram of a software-defined network (SDN) according to an embodiment of the disclosure.

FIG. 1 is a schematic diagram of a software-defined network (SDN) according to an embodiment of the disclosure. The SDN 100 includes a controller 110 and switches 121-124. The controller 110 and the switches 121-124 are coupled to each other within the SDN 100. The controller 110 controls a network topology and packet routing of the whole SDN 100. The switch 124 is coupled to a remote network 150. The remote network 150 can be the Internet or a local area network of a company or an organization. A base station 131 is coupled to the switch 121. An access point 132 is coupled to the switch 122. An access point 133 and a base station 134 are coupled to the switch 123.

The base stations 131, 134 and the access points 132 and 133 are all referred to as edge devices, and respectively belong to different wireless networks. A user equipment (UE) 140 can be a mobile electronic apparatus having a network function such as a smart phone or a tablet personal computer (PC), etc. The UE 140 has a plurality of network interfaces, where each of the network interfaces can be connected to an edge device for connecting the remote network 150 through the wireless network where the edge device belongs to and the SDN 100. In the present embodiment, the base stations 131 and 134 belong to a long term evolution (LTE) network. The access points 132 and 133 belong to a Wi-Fi network. One network interface of the UE 140 is connected to the LTE base station 131, and another network interface is connected to the Wi-Fi access point 132.

The disclosure is not limited to the two wireless networks of LTE and Wi-Fi. Another embodiment of the disclosure may also includes other types of wireless networks, for example, a 3G network and a worldwide interoperability for microwave access (WiMAX) network for providing the UE 140 to connect the SDN 100 and the remote network 150.

Figure 2:
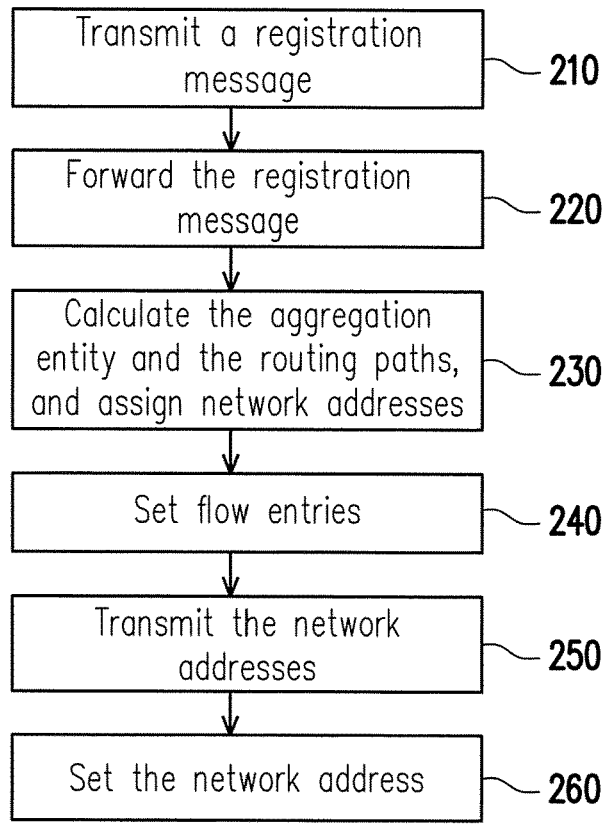
FIG. 2 to FIG. 4 are flowcharts illustrating control methods for an SDN according to an embodiment of the disclosure.

FIG. 2 is a flowchart illustrating a control method for the SDN 100 according to an embodiment of the disclosure. The control method of FIG. 2 is a registration flow of the UE 140 to the controller 110 when the UE 140 is connected to the SDN 100. In step 210, the UE 140 sends a registration message through a network interface, where the registration message includes a network access status of the UE 140. The network access status may record the edge device connected to each of the network interfaces of the UE 140 and the wireless network where the edge device belongs to. In step 220, the switch 121 or 122 receives the registration message, and forwards the registration message to the controller 110. In step 230, the controller 110 receives the registration message come from the UE 140. The controller 110 can select one of the switches 121-124 to serve as an aggregation entity (AE) for the UE 140 according to the network access status of the UE 140 and a load of each of the switches 121-124 of the SDN 100 in the step 230. In the present embodiment, the controller 110 selects the switch 121 as the AE.

In the step 230, the controller 110 can also calculate a plurality of routing paths between the UE 140 and the AE 121, where each of the routing paths is coupled to the AE 121 and one of a plurality of network interfaces of the UE 140. In the present embodiment, there are two routing paths. A first routing path includes the base station 131, and corresponds to the LTE network where the base station 131 belongs to. A second routing path includes the access point 132 and the switch 122, and corresponds to the Wi-Fi network where the access point 132 belongs to.

In the step 230, the controller 110 can also assign a network address of the UE 140 and a network address of the AE 121. The UE 140 requires the network address to receive downstream packets come from the remote network 150, and the AE 121 requires the network address to aggregate upstream packets sent by the UE 140.

Then, in step 240, the controller 110 sets flow entries in the AE 121 and each switch in the routing paths for routing packets between the UE 140 and the remote network 150. The AE 121 removes a tunnel header of the upstream packet according to the flow entries, and adds a tunnel header to the downstream packet. The other switches can forward the packets of the UE 140 to the UE 140, the AE 121 or the remote network 150 according to the flow entries.

In step 250, the controller 110 transmits the network address of the UE 140 and the network address of the AE 121 to the UE 140. In step 260, the UE 140 sets its own network address and records the network address of the AE 121. Now, the registration procedure is completed. The network address of the AE 121 can be a common aggregation point network address, i.e. the network addresses of all of the AEs in the SDN 100 can be the same. Since different UE 140 has a different network address, the controller 110 can route the packets of the UE 140 to AE 121 where the UE 140 belongs to according to the network address of the UE 140.

Figure 3:
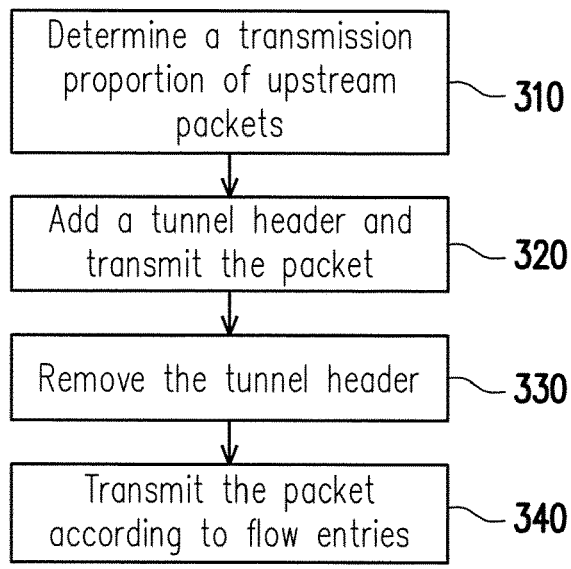

FIG. 3 is a flowchart illustrating a control method for the SDN 100 according to an embodiment of the disclosure. The control method of FIG. 3 is a flow that the UE 140 sends an upstream packet. The so-called upstream packet refers to a packet transmitted to the remote network 150 by the UE 140. In step 310, the UE 140 analyzes the packet to determine a transmission proportion of the upstream packet between the network interfaces. In step 320, the UE 140 selects the LTE network where the base station 131 belongs to or the Wi-Fi network where the access point 132 belongs to according to the transmission proportion to transmit the upstream packet. The UE 140 adds the tunnel header corresponding to the selected wireless network to the upstream packet, where a destination address in the tunnel header is the network address of the AE 121. Then, the UE 140 transmits the upstream packet to the AE 121 through the selected wireless network.

In step 330, the AE 121 receives the upstream packet, and removes the tunnel header of the upstream packet. In step 340, the AE 121 transmits the upstream packet to the remote network 150 according to the flow entries.

The UE 140 simultaneously connects a plurality of wireless networks, and packets of a same service flow can be spread in the wireless networks for transmission, and the packets are gathered at the AE 121. Since an uploading speed of each wireless network is probably different, a sequence of the packets reaching the AE 121 is probably different to a sending sequence of the UE 140. In order to correct the sequence disorder, regarding each service flow between the UE 140 and the remote network 150, after the AE 121 receives the upstream packets of the service flow and removes the tunnel header of the upstream packets, the AE 121 sorts the upstream packets according to sequence numbers of the upstream packets, and sequentially transmits the sorted upstream packets to the remote network 150. The sequence numbers of the upstream packets can be located in the tunnel headers of the upstream packets.

The AE 121 can set an ordering queue for each service flow between the UE 140 and the remote network 150, and sorts the upstream packets of the corresponding service flow according to the ordering queue. Each time when the AE 121 receives an upstream packet, the AE 121 puts the upstream packet into the ordering queue corresponding to the service flow where the upstream packet belongs to. A position of the upstream packet in the ordering queue is determined by the sequence number of the upstream packet. The smaller the sequence number of the packet is, the more front position the packet is located in the ordering queue. For each of the service flows, the AE 121 records a sequence number k of the upstream packet to be sent currently. If the sequence number of a first packet in the ordering queue corresponding to the service flow is k, the AE 121 sends the first packet and adds the sequence number k by one, and so on. If the sequence number of the first packet is not equal to k, the AE 121 activates a timer, and if the sequence number of the first packet is still not equal to k when the timer expires, the AE 121 sends all of the packets in the ordering queue.

Figure 4:
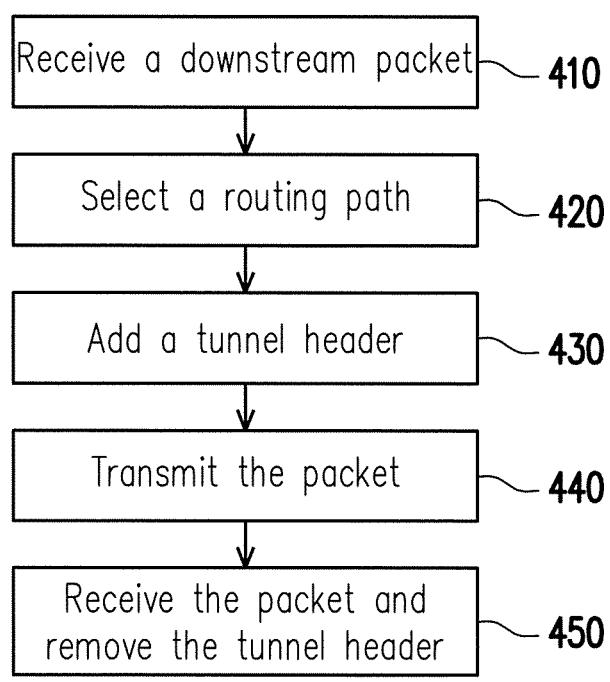

FIG. 4 is a flowchart illustrating a control method for the SDN 100 according to an embodiment of the disclosure. The control method of FIG. 4 is a processing flow of a downstream packet transmitted from the remote network 150 to the UE 140. In step 410, the AE 121 receives the downstream packet transmitted to the UE 140 from the remote network 150. In step 420, the AE 121 selects one of the routing paths for each of the downstream packets transmitted to the UE 140 according to a downstream packet transmission proportion between the routing paths, so as to transmit the downstream packet to the UE 140. The controller 110 determines the above downstream packet transmission proportion according to a status (for example, an available bandwidth) of each routing path, and transmits the downstream packet transmission proportion to the AE 121.

In step 430, the AE 121 adds a tunnel header corresponding to the selected routing path to the downstream packet. If the selected routing path is the routing path passing through the base station 131, the AE 121 adds a tunnel header of the LTE network to the downstream packet. If the selected routing path is the routing path passing through the access point 132, the AE 121 adds a tunnel header of the Wi-Fi network to the downstream packet. Then, in step 440, the AE 121 transmits the downstream packet to the UE 140 through the selected routing path.

In step 450, the UE 140 receives the downstream packet, and removes the tunnel header of the downstream packet, and transmits data or message in the downstream packet to corresponding application software. The UE 140 can set an ordering queue for each service flow, so as to sort the packets of each service flow for transmitting to the application software. The ordering queue of the UE 140 is similar to the ordering queue of the AE 121, and detail thereof is not repeated.

Figure 5:
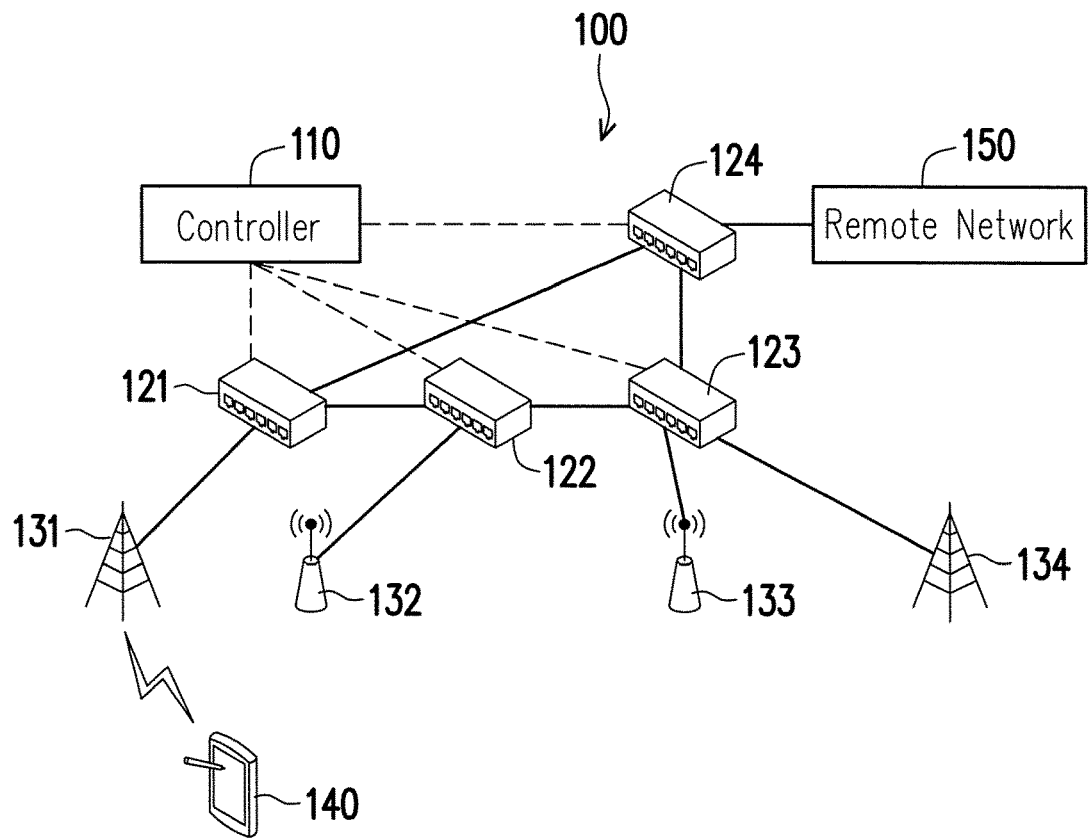
FIG. 5 is a schematic diagram of an SDN according to another embodiment of the disclosure.
Figure 6:
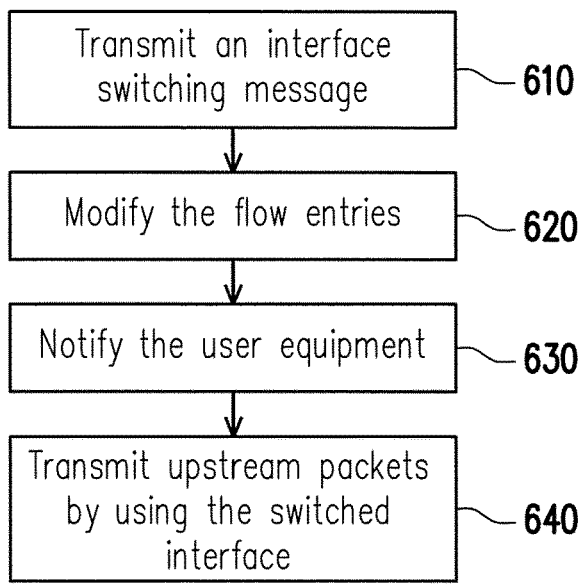
FIG. 6 is a flowchart of a control method for an SDN according to an embodiment of the disclosure.

FIG. 5 is a schematic diagram of the SDN 100 according to another embodiment of the disclosure. The SDN 100 of FIG. 5 is similar to that of FIG. 1, and a difference there between is that the UE 140 stops using the Wi-Fi network where the access point 132 belongs to as the UE detects a signal deterioration of the connection with the access point 132. FIG. 6 is a flowchart of a control method for the SDN 100 according to an embodiment of the disclosure, in which a flow of stop using the Wi-Fi network is illustrated.

In step 610, the UE 140 sends an interface switching message to notify the controller 110 that the UE 140 stops using the network interface connected to the access point 132. In step 620, the controller 110 receives the interface switching message, and modifies the flow entries of the AE 121 to stop using the routing path corresponding to the interface switching message (i.e. the routing path passing through the switch 122 and the access point 132), and uses the other routing path to transmit the downstream packet to the UE 140. In the present embodiment, there are only two routing paths originally, the remained downstream packets are transmitted through the routing path passing through the base station 131. In step 630, the controller 110 transmits a modification success message to the UE 140 to notify the UE 140 that the modification of the above flow entries is complete. In step 640, the UE 140 stops transmitting the upstream packet through the Wi-Fi network of the access point 132. Then, the upstream packets of the UE 140 are transmitted to the AE 121 through the LTE network of the base station 131.

Figure 7:
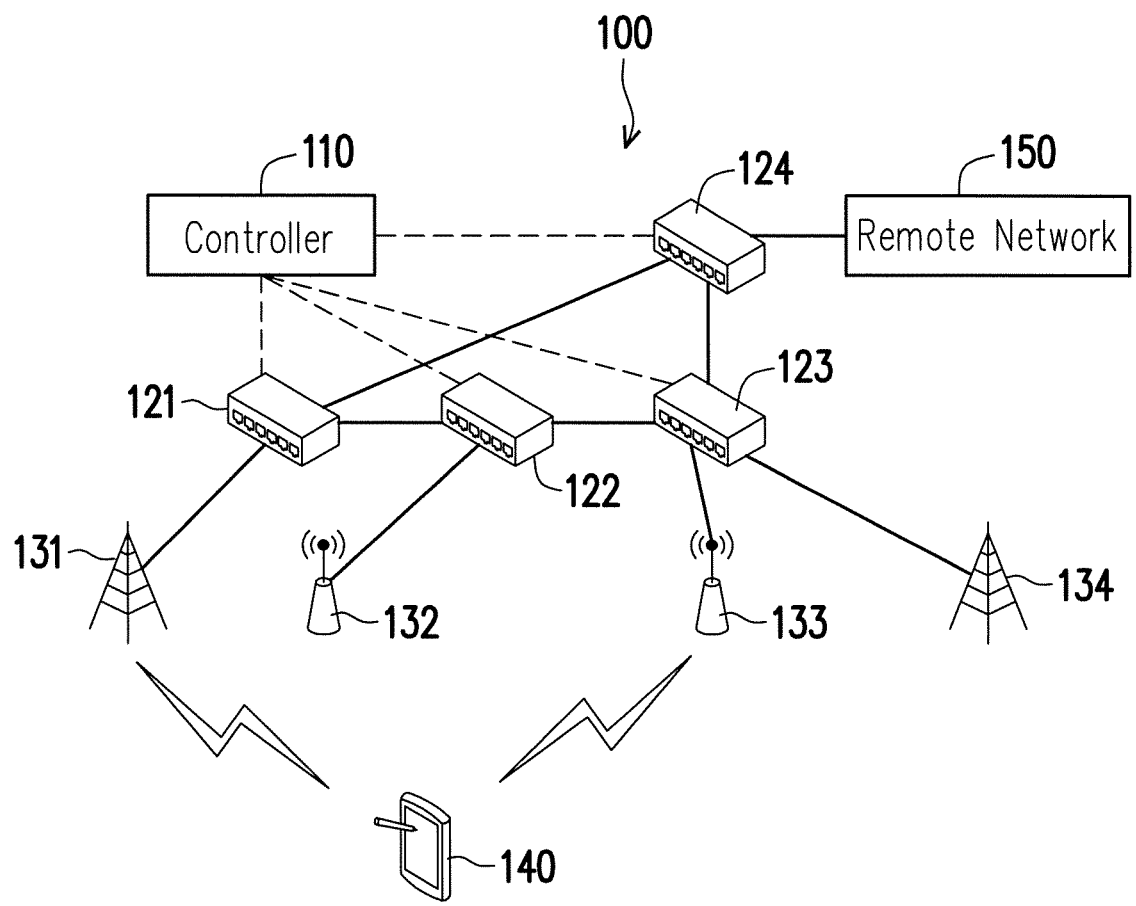
FIG. 7 is a schematic diagram of an SDN according to another embodiment of the disclosure.
Figure 8:
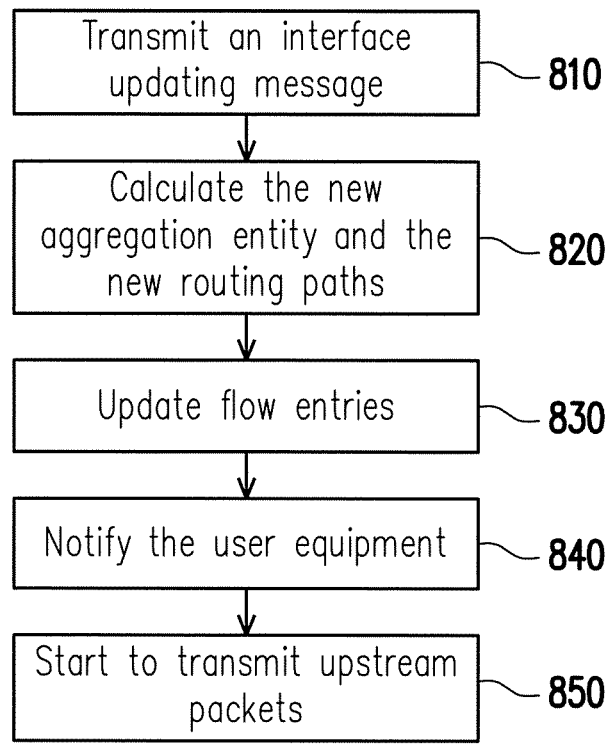
FIG. 8 is a flowchart of a control method for an SDN according to an embodiment of the disclosure.

FIG. 7 is a schematic diagram of the SDN 100 according to another embodiment of the disclosure. The SDN 100 of FIG. 7 is similar to that of FIG. 1, and a difference there between is that the UE 140 is changed to connect the LTE network of the base station 131 and the Wi-Fi network of the access point 133. FIG. 8 is a flowchart of a control method for the SDN 100 according to an embodiment of the disclosure, and FIG. 8 illustrates an AE transfer flow caused by changing of a network access status of the UE 140 of FIG. 7.

In step 810, the UE 140 sends an interface updating message to the controller 110. The interface updating message includes a latest network access status of the UE 140. In step 820, the controller 110 receives the interface updating message, and selects one of the switches 121-124 to serve as a new AE for the UE 140 according to the network access status in the interface updating message and a load of each of the switches 121-124 in the SDN 100. In the present embodiment, the new AE selected by the controller 110 is the switch 123. In the step 820, the controller 110 also calculates a plurality of new routing paths between the UE 140 and the new AE 123. In the present embodiment, there are two new routing paths, which respectively correspond to the LTE network of the base station 131 and the Wi-Fi network of the access point 133.

In step 830, the controller 110 updates the flow entries in the new AE 123, the original AE 121, and the switches in the new routing paths and the original routing paths, and transmits the packets between the UE 140 and the remote network 150 by using the new AE 123 and the new routing paths.

The step 820 of calculating the new AE and the new routing paths is similar to the step 230 of calculating the AE and the routing paths. The step 830 of updating the flow entries is similar to the step 240 of setting the flow entries, though in the step 830, the controller 110 is further required to remove the invalid flow entries in the original AE 121 and the switches in the original routing paths.

In step 840, the controller 110 transmits an update success message to the UE 140 to notify the UE 140 that updating of the flow entries is completed. In step 850, the UE 140 starts to transmit the upstream packets. The upstream packets can be transmitted to the new AE 123 through the LTE network of the base station 131 or the Wi-Fi network of the access point 133.

Figure 9:
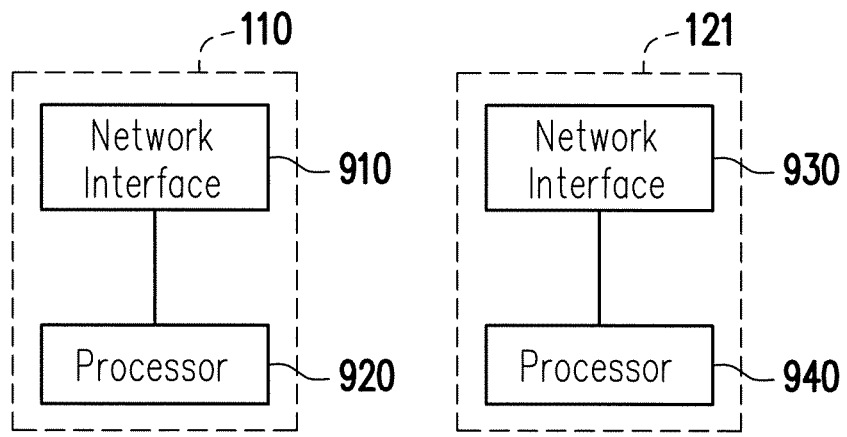
FIG. 9 is a schematic diagram of a controller and a switch according to an embodiment of the disclosure.

FIG. 9 is a schematic diagram of the controller 110 and the switch 121 according to an embodiment of the disclosure. The controller 110 includes a network interface 910 and a processor 920. The network interface 910 is coupled to the SDN 100 for transmitting and receiving packets for the controller 110. In the aforementioned embodiments, transmission and reception of all of data and messages of the controller 110 are implemented through the network interface 910. The processor 920 is coupled to the network interface 910. In the aforementioned method flows, each step executed by the controller 110 is executed by the processor 920.

The switch 121 includes a network interface 930 and a processor 940. The network interface 930 is coupled to the SDN 100 for transmitting and receiving packets for the switch 121. In the aforementioned embodiments, transmission and reception of all of data and messages of the switch 121 are implemented through the network interface 930. The processor 940 is coupled to the network interface 930. In the aforementioned method flows, each step executed by the switch 121 is executed by the processor 940.

Structures of the other switches 122-124 are all the same to that of the switch 121. Therefore, each of the switches 121-124 has the same function, and each of the switches 121-124 can serve as the AE.

In summary, in the embodiments of the disclosure, a different switch can be selected to serve as the AE for each UE, a plurality of spread AEs can be used to replace the single and centralized AE, and in the embodiments of the disclosure, according to a location of the UE, the switch located adjacent to the UE or having a less load can be selected as the AE. In this way, the load of the single AE is effectively dispersed, such that it is not liable to cause transmission performance bottleneck around each of the switches. The controller and the UE of the aforementioned embodiments can adjust the packet transmission proportion between the routing paths to balance a network usage rate of each routing path, so as to avoid a network congestion. The aforementioned embodiments also provide a change mechanism for the AE and the routing paths, and when the network access status of the UE is changed due to poor signal or mobility, the network aggregation service is not interrupted.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A packet processing method, comprising:
receiving, by an aggregation entity of a user equipment selected from one of a plurality of switches according to a network access status of the user equipment, an upstream packet transmitted to a remote network from a user equipment, wherein a tunnel header of the upstream packet is added by the user equipment;

removing, by the aggregation entity, a tunnel header of the upstream packet, and transmitting the upstream packet to the remote network according to a flow entry set in the plurality of switches;

receiving, by the aggregation entity, a downstream packet transmitted to the user equipment from the remote network;

selecting one of a plurality of routing paths coupled to the user equipment to transmit the downstream packet according to the status of each of the plurality of routing paths; and adding, by the aggregation entity, a tunnel header corresponding to the selected routing path to the downstream packet, and transmitting the downstream packet to the user equipment through the selected routing path.

2. The packet processing method as claimed in claim 1, further comprising:

determining a transmission proportion between the routing paths according to a status of each of the routing paths by a controller;

transmitting the transmission proportion from the controller to an aggregation equipment; and selecting one of the routing paths by the aggregation equipment to transmit the downstream packet according to the transmission proportion between the routing paths.

3. The packet processing method as claimed in claim 1, the packet processing method further comprises:

receiving a plurality of upstream packets of the service flow between the user equipment and the remote network, wherein the upstream packets respectively correspond to one of sequence numbers; and sorting the upstream packets according to the sequence numbers of the upstream packets, and sequentially transmitting the sorted upstream packets to the remote network.

4. The packet processing method as claimed in claim 3, wherein the sequence numbers are located in tunnel headers of the upstream packets.

* * * * *